United States Patent [19]

Huhn et al.

[11] Patent Number: 4,666,745

[45] Date of Patent: May 19, 1987

[54] ORGANOPOLYSILOXANES HAVING SI-BONDED HYDROGEN AND SIC-BONDED EPOXY GROUPS AND A PROCESS FOR PREPARING THE SAME

[75] Inventors: Karl Huhn; Rudolf Kaufmann, both of Burghausen, Fed. Rep. of Germany

[73] Assignee: Wacker-Chemie GmbH, Munich, Fed. Rep. of Germany

[21] Appl. No.: 885,102

[22] Filed: Jul. 14, 1986

Related U.S. Application Data

[62] Division of Ser. No. 763,865, Aug. 9, 1985, Pat. No. 4,625,010.

[51] Int. Cl.$^4$ .............................................. B05D 3/02
[52] U.S. Cl. ................................ 427/393.4; 427/387; 427/180; 428/447; 524/506; 524/588; 525/100; 525/101; 525/104; 525/106; 528/15; 528/27; 528/31
[58] Field of Search ................. 528/15, 27, 31; 525/101, 104, 106, 100; 524/506, 588; 427/387, 393.4, 180; 428/447

[56] References Cited

U.S. PATENT DOCUMENTS 2,803,615  8/1957  Ahlbrecht et al. ................. 526/288
4,004,059  1/1977  Deiner et al. ....................... 427/387
4,046,930  9/1977  Johnson et al. .................... 427/387

Primary Examiner—Melvyn I. Marquis

[57] ABSTRACT

Novel organopolysiloxanes are described in which the organopolysiloxanes are terminated by units of the formula $R_3SiO_{\frac{1}{2}}$ and comprise units of the formulas $RR^1SiO$, $RR^2SiO$, $RR^3SiO$, $RHSiO$ and $R_2SiO$, where R represents the same or different alkyl radicals having from 1 to 4 carbon atoms per radical, or phenyl radicals, $R^1$ represents the same or different alkyl radicals having at least 6 carbon atoms per radical, $R^2$ represents the same or different aralkyl radicals and $R^3$ represents the same or different, SiC-bonded, monovalent organic radicals having at least one vicinal epoxy group per radical. These organopolysiloxanes are preferably prepared by reacting organopolysiloxanes which contain units of the formulas $R_3SiO_{\frac{1}{2}}$ and $RHSiO$ and optionally units of the formula $R_2SiO$, wherein R is the same as above, with an organic compound that has a terminal C=C-bond and at least one vicinal epoxy group per molecule, at least one alkene having at least 6 carbon atoms per molecule, and at least one aralkene in the presence of a catalyst which promotes the addition of Si-bonded hydrogen to the aliphatic C=C bond. These organopolysiloxanes may be applied simultaneously with a polymer having perfluoroalkyl groups with at least 3 carbon atoms per alkyl group to fibers to render them oil and water repellent.

7 Claims, No Drawings

ORGANOPOLYSILOXANES HAVING SI-BONDED HYDROGEN AND SIC-BONDED EPOXY GROUPS AND A PROCESS FOR PREPARING THE SAME

This is a division of application Ser. No. 763,865, filed Aug. 9, 1985 now U.S. Pat. No. 4,625,010.

The present invention relates to organopolysiloxanes, and particularly to organopolysiloxanes having silicon-bonded hydrogen and SiC-bonded epoxy groups. The present invention relates particularly to a process for preparing organopolysiloxanes having Si-bonded hydrogen and SiC-bonded epoxy groups and more particularly to a process for treating fibers to impart oil and water repellency thereto.

BACKGROUND OF THE INVENTION

Fibers have been treated heretofore with aqueous emulsions to impart water and oil repellency thereto. U.S. Pat. No. 4,004,059 to Deiner et al, for example, discloses impregnating fibers with an aqueous emulsion containing a polymer having perfluoroalkyl groups having at least 4 carbon atoms per alkyl group and an addition product of an olefin and an organopolysiloxane having Si-bonded hydrogen, in which the addition product has, on the average more than 7 carbon atoms in the alkyl radical, to impart oil and water repellency to the treated fibers.

Organopolysiloxanes having SiC-bonded monovalent organic radicals having one vicinal epoxy group per radical and aralkyl radicals are described in U.S. Pat. No. 4,046,930 to Johnson et al. This reference does not, however, disclose an organopolysiloxane having the organosiloxane units described in the present invention.

Therefore, it is an object of the present invention to provide organopolysiloxanes having a silicon-bonded hydrogen atom and SiC-bonded epoxy groups. Another object of the present invention is to provide organopolysiloxanes having a silicon-bonded hydrogen atom which may be emulsified in water without the concurrent use of an organic solvent. Another object of the present invention is to provide stable aqueous emulsions containing a high percentage of organopolysiloxanes. Still another object of the present invention is to provide a process for preparing organopolysiloxanes having a silicon-bonded hydrogen atom and SiC-bonded epoxy groups. A further object of the present invention is to provide a composition which will impart water and oil repellency to fibers treated therewith. A still further object of the present invention is to provide an organopolysiloxane, which when combined with a polymer having perfluoroalkyl groups, imparts water and oil repellency to fibers treated therewith.

SUMMARY OF THE INVENTION

The foregoing objects and others which will become apparent from the following description are accomplished in accordance with this invention, generally speaking, by providing organopolysiloxanes which are terminated by units of the formula $R_3SiO_{\frac{1}{2}}$ and comprise
20 to 90 mole percent of units of the formula $RR^1SiO$
3 to 30 mole percent of units of the formula $RR^2SiO$
3 to 30 mole percent of units of the formula $RR^3SiO$
3 to 60 mole percent of units of the formula $RHSiO$
0 to 60 mole percent of units of the formula $R_2SiO$,
in which the sum of the percentages adds up to 100 mole percent, where R represents the same or different alkyl radicals having from 1 to 4 carbon atoms per radical, or a phenyl radical, $R^1$ represents the same or different alkyl radicals having at least 6 carbon atoms per radical, $R^2$ represents the same or different, aralkyl radicals or alkylated aralkyl radicals and $R^3$ represents the same or different, SiC-bonded, monovalent organic radicals having at least one vicinal epoxy group per radical.

These organopolysiloxanes are prepared by reacting organopolysiloxanes which contain units of the formula $R_3SiO_{\frac{1}{2}}$ and RHSiO and, optionally, units of the formula $R_2SiO$ with an organic compound that has a terminal $C\!=\!C$ bond and at least one vicinal epoxy group per molecule, at least one alkene having at least 6 carbon atoms per molecule and at least one aralkene in the presence of a catalyst which promotes the addition of Si-bonded hydrogen to the aliphatic $C\!=\!C$ bond.

DESCRIPTION OF THE INVENTION

The organopolysiloxanes of this invention may be represented by the general formula

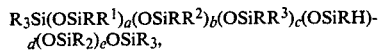

where each R, $R^1$, $R^2$ and $R^3$ is the same as above,
$a = 0.2$ m to $0.9$ m,
$b = 0.03$ m to $0.3$ m,
$c = 0.03$ m to $0.3$ m,
$d = 0.03$ m to $0.6$ m,
$e = 0$ m to $0.6$ m,
where $a+b+c+d+e=m=$ an integer of from 8 to 1000.

Preferably, the organopolysiloxanes of this invention have an average of from 10 to 1000 silicon atoms per molecule.

In addition to the siloxane units represented in the above formula, other siloxane units may also be present. Examples of such other siloxane units, which are usually only present, however, as impurities are those of the formula $RSiO_{3/2}$, wherein R is the same as above, and $SiO_{4/2}$. Preferably, however, the amount of such siloxane units other than the siloxane units in the above specified formula having the $R_3SiO_{\frac{1}{2}}$ units is at most 1 mole percent of the total organosiloxane units present.

The methyl radical is the preferred radical represented by R. Other examples of alkyl radicals represented by R are ethyl, n-propyl, isopropyl, n-butyl and the sec-butyl radicals. When R represents phenyl radicals, then they are preferably present only in units of the formula $R_2SiO$.

Preferably, the alkyl radicals represented by $R^1$ contain at most 20 carbon atoms per radical. Examples of alkyl radicals represented by $R^1$ are the n-hexyl radical, heptyl radical, the 2-ethylhexyl radical, n-decyl, n-dodecyl, n-tetradecyl, n-pentadecyl radicals and octadecyl radicals. The alkyl radicals represented by $R^1$ may also be cyclic radicals, such as the cyclohexyl radical and methylcyclohexyl radicals.

Preferably, the alkylated aralkyl radicals represented by $R^2$ have a total of from 8 to 20 carbon atoms per radical. The preferred aralkyl radical represented by $R^2$ is the 2-phenylpropyl radical. Examples of other alkylated aralkyl radicals represented by $R^2$ are the 2-(2-methylphenyl)ethyl radical and the 2-(4-methylphenyl)ethyl radical.

The organic radicals represented by $R^3$ having at least one vicinal epoxy group, i.e., an epoxy group of the formula

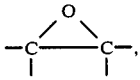

are preferably composed only of carbon, hydrogen and epoxy-oxygen atoms, or carbon, hydrogen and epoxy-oxygen atoms, as well as ether-oxygen atoms and/or carbonyl-oxygen atoms.

It is preferred that the radicals represented by $R^3$ contain at most 20 carbon atoms per radical. Preferably, the $R^3$ radical is a radical of the formula

where n is an integer from 3 to 6, and more preferably n is 3. Other examples of radicals represented by $R^3$ are 3,4-epoxycyclohexyl, 3,4-epoxycyclohexyl-1-ethyl, 3,4-epoxycyclohexyl-6-methyl-3,4-epoxycyclohexyl, 3-oxa-tricyclo[3,2,1,0$^{2,4}$]-octan-6-propyl, 7-butyl-3-oxatricyclo[3,2,1,0$^{2,4}$]9-octan-6-methyl, 9,10-epoxystearyl, p-(2,3-epoxybutyl)phenyl and 3-(2,3-epoxybutyl)cyclohexyl radicals, and the radical of the formula

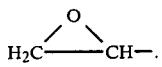

The invention also relates to a process for preparing organopolysiloxanes having Si-bonded hydrogen and SiC-bonded epoxy groups by reacting an organopolysiloxane that contains units of the formula $R_3SiO_{\frac{1}{2}}$ and RHSiO and optionally units of the formula $R_2SiO$ with an organic compound that has at least one vicinal epoxy group per molecule, which is composed of carbon, hydrogen and epoxy-oxygen atoms, and optionally ether-oxygen and/or carbonyl-oxygen atoms, and has a terminal carbon-carbon double bond, in the presence of a catalyst which promotes the addition of Si-bonded hydrogen to the aliphatic carbon-carbon double bond. The organopolysiloxane reacted with the organic compound of the type described above having at least one epoxy group per molecule may be further represented by the formula $R_3Si(OSiRH)_{m-f}(OSiR_2)_fOSiR_3$, where each R and m is the same as above and f is 0 or is from 1 to 0.6 m. The organopolysiloxane represented by the formula above is reacted with the organic compound having at least one epoxy group per molecule in amounts of from 0.035 to 0.54 mole per gram-atom of Si-bonded hydrogen, at least one alkene having at least 6 carbon atoms per molecule in amounts of from 0.23 to 0.91 mole per gram-atom of Si-bonded hydrogen, and at least one optionally alkylated aralkene in an amount of from 0.035 to 0.54 mole per gram-atom of Si-bonded hydrogen, the organic compound containing epoxide group(s), the alkene and the aralkene, which may optionally be alkylated, being used in total amount up to 0.97 mole per gram-atom of Si-bonded hydrogen.

The compound of the formula

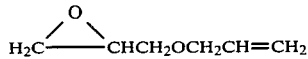

is, of course, especially preferred as the compound containing at least one epoxy group that is used in the process of this invention for the preparation of specific organopolysiloxanes. A further example of such a compound containing at least one epoxy group is 1-allyl-3,4-epoxycyclohexane.

Examples of alkenes having at least 6 carbon atoms per molecule are n-hexene-1, n-heptene-1, 2-ethylhexene-6, n-decene-1, n-dodecene-1, n-tetradecene-1, n-pentadecene-1 and n-octadecene-1, and also cyclohexene and methylcyclohexenes.

A preferred example of an aralkene is alpha-methylstyrene.

In the process of this invention, any catalyst which is capable of promoting the addition of Si-bonded hydrogen to the aliphatic carbon-carbon double bond may be used. An example of such a catalyst is $H_2PtCl_6 \cdot 6H_2O$.

The process of this invention is preferably carried out in a solvent that is inert to the reactants and the catalyst. An example of a suitable solvent is an alkane mixture having a boiling range of from 80° to 110° C. at 1013 Hpa (abs.).

The process of this invention for preparing specific organopolysiloxanes can be carried out at any temperature and pressure at which the addition of Si-bonded hydrogen to an aliphatic carbon-carbon double bond in the presence of a catalyst which promotes the addition has previously been carried out. The process is preferably conducted at temperatures of from 70° to 150° C. and at atmospheric pressure, that is, 1020 hPa or approximately 1020 hPa.

Once the process is complete, the catalyst is preferably removed from the organopolysiloxanes, for example, by adding activated carbon and then filtering, in order to prevent Si-bonded hydrogen from splitting off.

Likewise, the solvent is preferably evaporated off after the organopolysiloxanes have been prepared and the catalyst has been removed from the organopolysiloxanes.

The invention also relates to a process for treating fibers to render them oil- and water-repellent, which comprises simultaneously applying to the fibers a polymer having perfluoroalkyl groups of at least 3 carbon atoms per alkyl group and an organopolysiloxane having terminated units of the formula $R_3SiO_{\frac{1}{2}}$ and containing 20 to 90 mole percent of units of the formula $RR^1SiO$,
3 to 30 mole percent of units of the formula $RR^2SiO$,
3 to 30 mole percent of units of the formula $RR^3SiO$,
3 to 30 mole percent of units of the formula RHSiO,
0 to 60 mole percent of units of the formula $R_2SiO$, in which each R, $R^1$, $R^2$ and $R^3$ is the same as above and the sum of the percentages chosen equal 100 mole percent.

Preferably, the organopolysiloxane described above is used in an amount of from 50 to 150 percent by weight, based on the total weight of the above organopolysiloxane and the polymer having perfluoroalkyl groups with at least 3 carbon atoms and more preferably at least 4 carbon atoms per alkyl group.

The fibers that are rendered simultaneously oil- and water-repellent by the simultaneous application of the organopolysiloxane of this invention and the polymer having perfluoroalkyl groups with at least 3 carbon atoms per group may be inorganic fibers, such as asbestos, including asbestos foams, or glass fibers, especially those that are used for heat insulation.

Preferably, however, the fibers that are rendered simultaneously oil- and water-repellent by simultaneous application of the organopolysiloxane of this invention and the polymer having perfluoroalkyl groups with at least 3 carbon atoms per group are organic fibers of natural and synthetic origin. Examples of such fibers are those made of keratin, especially wool, cotton, rayon, hemp, natural silk, polypropylene, polyethylene, polyester, polyurethane, polyamide, cellulose acetate and mixtures of at least two such types of fibers. The process of this invention is especially useful in the treatment of fibers which contain cellulose or consist of cellulose. The fibers may be in the form of fleeces, threads, yarns, mats, fabrics, knitted textiles, including articles of clothing or parts of articles of clothing.

The simultaneous application of the organopolysiloxane of this invention and the polymer having perfluoroalkyl groups with at least 3 carbon atoms per group to the fibers to be rendered oil- and water-repellent can be carried out in any manner suitable for applying liquids to fibers. The organopolysiloxane and polymer having perfluoroalkyl groups can be applied to the fibers by immersion, spreading, pouring, spraying, including spraying from an aerosol pack, rolling or padding.

Any polymers containing perfluoroalkyl groups having at least 3 carbon atoms per alkyl group which are described in U.S. Pat. No. 4,004,059 to Deiner et al may be used in the process of this invention for rendering fibers oil- and water-repellent.

In contrast to the teachings of U.S. Pat. No. 4,004,059 to Deiner et al, the organopolysiloxane of this invention is preferably free of organic solvents at least before they are mixed with the polymer having perfluoroalkyl groups having at least 3 carbon atoms per alkyl group.

In the process of this invention for rendering fibers oil- and water-repellent, it is preferred that the organopolysiloxane of this invention and the polymer having perfluoroalkyl groups with at least 3 carbon atoms per alkyl group be applied to the fibers in the form of an aqueous emulsion. In addition, the polymer having perfluoroalkyl groups with at least 3 carbon atoms per alkyl group may be emulsified in water, such as described in U.S. Pat. No. 4,004,059 to Deiner et al.

The organopolysiloxane of this invention is, however, preferably emulsified in water without the concurrent use of an organic solvent, but with the concurrent use of non-ionic, anionic or cationic emulsifiers. Preferably, the organopolysiloxane is present in the aqueous emulsions in an amount of from 20 to 65 percent by weight, and more preferably from 35 to 50 percent by weight, based on the total weight of the organopolysiloxane of this invention and water.

Examples of non-ionic emulsifiers are polyglycol ethers of alkanols, phenol or alkylphenols, such as nonylphenol polyglycol ether, tert-butylphenol polyglycol ether, polyoxyethylene isotridecyl and polyethylene glycol trimethylnonyl ether, polyoxyethylene sorbitan hexastearate, polyoxyethylene sorbitanoleate and dimethylsiloxane/ethylene oxide block copolymers.

Examples of anionic emulsifiers are alkylbenzene sulphonates and sodium alkylaryl polyethylene glycol sulphonates.

Examples of cationic emulsifiers are tetraalkylammonium salts, such as tetraalkylammonium chlorides, for example hexadecyltrimethylammonium chloride, and also acid amide-ethylene oxide adducts of the formula

and amine-ethylene oxide adducts of the formula

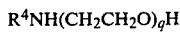

where $R^4$ represents an alkyl radical having from 6 to 30 carbon atoms per radical and q represents an integer of from 1 to 30. The amine-ethylene oxide adducts may also be present in the form of their salts with inorganic acids, such as hydrochloric acid, or low-molecular weight organic acids, such as acetic acid.

Cationic emulsifiers are preferred. The emulsifiers are preferably used in an amount of from 2 to 15 percent by weight, and more preferably from 5 to 10 percent by weight based on the weight of the organopolysiloxane to be emulsified.

Any apparatus suitable for preparing aqueous emulsions, such as high-speed stirrers, may be used to prepare the emulsions of this invention.

In the process of this invention for rendering fibers simultaneously oil- and water-repellent, additional substances such as textile finishing substances may optionally be used with the organopolysiloxanes of this invention, the polymer having perfluoroalkyl groups with at least 3 carbon atoms per alkyl group and the substances optionally used for preparing the emulsions, such as water and emulsifier. Such textile finishing substances include, for example, so-called "crease-resistant finishes", such as dimethylol dihydroxyethylene urea (DMDHEU) in admixture with zinc nitrate, especially if the fibers to be rendered sumultaneously oil- and water-repellent are made of cellulose or are fiber mixtures which contain cellulose fibers.

EXAMPLE 1

In a two-liter flask equipped with a Claisen head, stirrer, reflux condenser, thermometer, dropping funnel and gas inlet tube, 300 g of a trimethylsiloxy terminated methylhydrogenpolysiloxane having a viscosity of 23 $mm^2.s^{-1}$ at 25° C. are heated under nitrogen to about 105° C. in 240 ml of an alkane mixture having a boiling range of from 80° to 110° C. at 1013 hPa (abs.). After interrupting the flow of nitrogen, a mixture consisting of 88.5 g of alpha-methyl styrene and 0.47 ml of a 1 percent by weight solution of $H_2PtCl_6.6H_2O$ in isopropanol is added over a period of 20 minutes while stirring, to the contents of the flask, while maintaining the temperature at about 105° C. Stirring is then continued for an additional 15 minutes at about 105° C., whereupon a mixture consisting of 57.0 g of a compound of the formula

630 g of n-dodecene-1 and 1.0 ml of a 1 percent by weight solution of $H_2PtCl_6.6H_2O$ in isopropanol is added to the resultant mixture at 90° C. over a period of 100 minutes with agitation. After stirring for an additional 30 minutes at 90° C., a mixture consisting of 15 g of the epoxy compound of the above formula and 0.12 ml of a 1 percent by weight solution of $H_2PtCl_6.6H_2O$ in isopropanol is added to the resultant mixture over a period of 4 minutes with agitation. The contents of the flask are heated under reflux for one hour, the temperature of the contents being from 135° to 138° C. The contents of the flask boiling up to 150° C. at 1 hPa (abs.) are distilled off. A clear, slightly brownish oil having a viscosity of 1077 $mm^2.s^{-1}$ at 25° C. is obtained. The chains between the trimethylsiloxane units have the following composition based on the determination of Si-bonded hydrogen and epoxide groups and on the NMR-spectrum:

73.2 mole percent of methyldodecylsiloxane units,
11.8 mole percent of methyl-2-phenylpropylsiloxane units,
9.1 mole percent of units of the formula

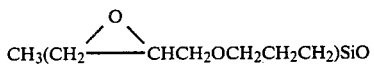

and
5.9 mole percent of methylhydrogensiloxane units.

EXAMPLE 2

A two liter flask equipped with a Claisen head, stirrer, reflux condenser, thermometer, dropping funnel and gas inlet tube, and containing 743.7 g of a trimethylsiloxy terminated organopolysiloxane and comprising 50 mole percent of dimethylsiloxane units and 50 mole percent of methylhydrogensiloxane units in random distribution and having a viscosity of about 30 $mm^2.s^{-1}$ at 25° C. are heated under nitrogen to about 105° C. in 205 ml of an alkane mixture having a boiling range of from 80° to 110° C. at 1013 hPa (abs.). After interrupting the flow of nitrogen, a mixture consisting of 52.5 g of alpha-methyl styrene and 0.133 ml of a 1 percent by weight solution of $H_2PtCl_6.6H_2O$ in isopropanol is added over a period of 12 minutes with agitation, to the contents of the flask, while maintaining the temperature at about 105° C. Stirring is then continued for an additional 30 minutes at about 105° C., then a mixture containing 399 g of n-dodecene-1 and 0.24 ml of a 1 percent by weight solution of $H_2PtCl_6.6H_2O$ in isopropanol is added to the resultant mixture with agitation over a period of about 75 minutes at 120° C. After stirring for an additional 30 minutes at 120° C., a mixture containing 63.3 g of the epoxy compound having the formula shown in Example 1 and 0.051 ml of a 1 percent by weight solution of $H_2PtCl_6.6H_2O$ in isopropanol is added to the resultant mixture over a period of about 15 minutes, with agitation. The contents of the flask are then stirred for an additional 30 minutes at 120° C., then activated carbon is added and the contents of the flask are filtered while still warm. The volatile constituents, boiling at up to 120° C. at 1 hPa (abs.), are distilled off. A clear, colorless oil having a viscosity of 190 $mm^2.s^{-1}$ at 25° C. and a refractive index of 1.4339 at 120° C. is obtained. The chains between the trimethylsiloxane units have the following composition based on the determination of Si-bonded hydrogen and epoxide groups and on the NMR-spectrum:

50 mole percent of dimethylsiloxane units
20.2 mole percent of methyldodecylsiloxane units
4.1 mole percent of methyl-2-phenylpropylsiloxane units
5.0 mole percent of units of the formula

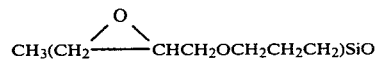

and
20.7 mole percent of methylhydrogensiloxane units.

EXAMPLE 3

A two-liter flask equipped with a Claisen head, stirrer, reflux condenser, thermometer, dropping funnel and gas inlet tube and containing 300 g of trimethylsiloxy terminated methylhydrogensiloxane having a viscosity of 23 $mm^2.s^{-1}$ at 25° C. are heated under nitrogen to about 105° C. in 240 ml of an alkane mixture having a boiling range of from 80° to 110° C. at 1013 hPa (abs.). After interrupting the flow of nitrogen, a mixture consisting of 88.5 g of alpha-methyl styrene and 0.47 ml of a 1 percent by weight solution of $H_2PtCl_6.6H_2O$ in isopropanol is added to the contents of the flask over a period of 20 minutes with agitation. The temperature of the contents of the flask increases to about 115° C. Stirring is continued for an additional 15 minutes at 140° C., whereupon a mixture consisting of 630 g of n-dodecene-1 and 0.8 ml of a 1 percent by weight solution of $H_2PtCl_6.6H_2O$ in isopropanol is added to the resultant mixture over a period of about 115 minutes, at a temperature of from about 108° to 140° C., with agitation. After stirring for an additional 30 minutes at 140° C., a mixture consisting of 62.7 g of the epoxy compound of the formula shown in Example 1 and 0.55 ml of a 1 percent by weight solution of $H_2PtCl_6.6H_2O$ in isopropanol is added to the resultant mixture over a period of about 25 minutes at a temperature of from 120° to 140° C. The contents of the flask are then stirred for one hour at a temperature of from 120° to 140° C. The contents of the flask boiling up to about 150° C. at 1 hPa (abs.) are distilled off. Activated carbon is then added to the residue in the flask and then filtered. A clear, slightly yellowish oil having a viscosity of 1094 $mm^2.s^{-1}$ at 25° C. is obtained. The chains between the trimethylsiloxane units have the following composition based on the determination of Si-bonded hydrogen and epoxide groups and on the NMR-spectrum:

84.3 mole percent of the methyldodecylsiloxane units
7.5 mole percent of methyl-2-phenylpropylsiloxane units
4.4 mole percent of units of the formula

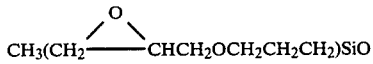

and
3.8 mole percent of methylhydrogensiloxane units.

In the following examples, a high-speed stirrer is used for preparing the emulsions. All parts and percentages in these examples are by weight, unless otherwise specified.

EXAMPLE 4

About 35 parts of the organopolysiloxane prepared in accordance with Example 1 are mixed with 3 parts of hexadecyltrimethylammonium chloride and 3 parts of water. An emulsion is prepared from the mixture by adding 59 parts of water.

A fabric consisting of 35 percent cotton and 65 percent polyester is immersed in an emulsion comprising:

30 g/l of the emulsion of a polymer containing perfluoroalkyl groups prepared in accordance with Example 8 of U.S. Pat. No. 2,803,615 to Ahlbrecht et al;

20 g/l of an organopolysiloxane emulsion prepared above;

950 g/l of water (in addition to the water present in the emulsion); and then squeezed until it has absorbed 100 percent of the liquid. The fabric thus impregnated is then heated for 10 minutes at 150° C.

The impregnated fabric has a pleasant, soft feel. The oil-repellency is tested in accordance with AATCC 118-1966, and water-repellency in accordance with the so-called "spray test" (AATCC 22-1967). The following values are obtained:

| Number of washes at 60° C. in a domestic washing machine. | 0 | 3 |
| --- | --- | --- |
| Oil-repellency | 5 | 4 |
| Water-repellency | 100 | 100 |

The feel is substantially the same before and after the washing.

EXAMPLE 5

About 35 parts of the organopolysiloxane prepared in accordance with Example 2 are mixed with 3 parts of hexadecyltrimethylammonium chloride and 3 parts of water. An emulsion is prepared from the mixture by adding 59 parts of water.

A fabric consisting of 35 percent cotton and 65 percent polyester is immersed in an emulsion comprising:

30 g/l of the emulsion of a polymer containing perfluoroalkyl groups prepared in accordance with Example 8 of U.S. Pat. No. 2,803,615;

15 g/l of the organopolysiloxane emulsion, prepared above;

50 g/l of 45 percent solution of DMDHEU;

5 g/l of zinc nitrate; and 900 g/l of additional water; and then squeezed until it has absorbed 100 percent of the liquid. The fabric thus impregnated is then heated for 10 minutes at 150° C.

The impregnated fabric obtained in this manner has a pleasant soft hand. The following values were obtained in the test for oil- and water-repellency:

| Number of washes at 60° C. in a domestic washing machine. | 0 | 3 |
| --- | --- | --- |
| Oil-repellency (AATCC 118-1966) | 6 | 5 |
| Water-repellency (AATCC 22-1967) | 100 | 100 |

The feel is substantially the same before and after the washing.

EXAMPLE 6

About 35 parts of the organopolysiloxane prepared in accordance with Example 3 are mixed with 3 parts of hexadecyltrimethylammonium chloride and 3 parts of water. An emulsion is prepared from the mixture by adding 59 parts of water.

Polyamide fabric is immersed in an emulsion comprising:

25 g/l of the emulsion of a polymer containing perfluoroalkyl groups prepared in accordance with Example 8 of U.S. Pat. No. 2,803,615;

25 g/l of an organopolysiloxane emulsion, prepared in accordance with the procedure described above; and 950 g/l of additional water; and is then squeezed until it has absorbed 100 percent of the liquid. The fabric thus impregnated is then heated for 10 minutes at 150° C.

The impregnated fabric obtained in this manner has a pleasant soft hand. The following values were obtained in the test for oil- and water-repellency:

| Number of washes at 60° C. in a domestic washing machine | 0 | 3 |
| --- | --- | --- |
| Oil-repellency (AATCC 118-1966) | 6 | 5 |
| Water-repellency (AATCC 22-1967) | 100 | 90 to 100 |

The feel is substantially the same before and after washing.

What is claimed is:

1. A process for simultaneously imparting oil- and water-repellent properties to fibers which comprises simultaneously applying to the fibers a polymer having perfluoroalkyl groups with at least 3 carbon atoms per alkyl group and an organopolysiloxane terminated by units of the formula $R_3SiO_{\frac{1}{2}}$ and comprising 20 to 90 mole percent of units of the formula $RR^1SiO$, 3 to 30 mole percent of units of the formula $RR^2SiO$, 3 to 30 mole percent of units of the formula $RR^3SiO$, 3 to 60 mole percent of units of the formula $RHSiO$, and 0 to 60 mole percent of units of the formula $R_2SiO$, where R is selected from the group consisting of alkyl radicals having from 1 to 4 carbon atoms per radical and a phenyl radical, $R^1$ is an alkyl radical having at least 6 carbon atoms per radical, $R^2$ is selected from the group consisting of aralkyl radicals and alkylated aralkyl radicals and $R^3$ represents SiC-bonded monovalent organic radicals having in each case at least one vicinal epoxy group per radical, in which the sum of the percentages adds up to 100 mole percent.

2. The process of claim 1, wherein the organopolysiloxane is present in an amount of from 50 to 150 percent by weight based on the weight of the organopolysiloxane and the polymer having perfluoroalkyl groups.

3. The process of claim 1, wherein the organopolysiloxane has an average of from 10 to 1000 silicon atoms per molecule.

4. The process of claim 2, wherein the polymer having the perfluoroalkyl groups and the organopolysiloxane are applied to the fibers as an aqueous emulsion.

5. The process of claim 4, wherein the organopolysiloxane is emulsified in water in the presence of an emulsifier selected from the group consisting of non-ionic, anionic and cationic emulsifiers.

6. The process of claim 4, wherein the organopolysiloxane is present in the aqueous emulsion in an amount of from 20 to 65 percent by weight based on the weight of the organopolysiloxane and water.

7. The process of claim 1, wherein the fibers are organic fibers.

* * * * *